United States Patent [19]

König et al.

[11] Patent Number: 5,532,313

[45] Date of Patent: Jul. 2, 1996

[54] HEAT CURABLE COATING COMPOSITIONS AND THEIR USE AS TOP COATS

[75] Inventors: Eberhard König, Leverkusen; Theodor Engbert; Josef Pedain, both of Köln, all of Germany

[73] Assignee: Bayer Aktiengesellschaft, Leverkusen, Germany

[21] Appl. No.: 436,938

[22] Filed: May 8, 1995

[30] Foreign Application Priority Data

May 18, 1994 [DE] Germany .......................... 44 17 355.5

[51] Int. Cl.⁶ .......................... C08F 8/30; C08F 283/04; C08L 75/00; C08G 18/81
[52] U.S. Cl. .......................... 524/590; 525/123; 525/124; 525/127; 525/131; 525/455; 528/45
[58] Field of Search .......................... 528/45; 525/123, 525/124, 127, 131, 455; 524/590

[56] References Cited

U.S. PATENT DOCUMENTS

| | | | |
|---|---|---|---|
| 3,770,703 | 11/1973 | Gruber et al. | 260/77.5 |
| 4,409,340 | 10/1983 | Stolzenbach et al. | 521/159 |
| 4,446,293 | 5/1984 | Konig et al. | 528/45 |
| 5,066,733 | 11/1991 | Martz et al. | 525/455 |

FOREIGN PATENT DOCUMENTS 2079981 11/1993 Canada .

48-19559 6/1973 Japan .................... 525/455

*Primary Examiner*—Paul R. Michl
*Assistant Examiner*—Patrick Niland
*Attorney, Agent, or Firm*—Joseph C. Gil; Thomas W. Roy

[57] ABSTRACT

The present invention relates to heat curable coating compositions containing a binder consisting essentially of A) prepolymers which have butanone oxime-blocked isocyanate groups and are prepared from
  A1) (cyclo)aliphatic polyisocyanates and
  A2) an organic polyhydroxyl component in which
    A2.1) 50 to 90% of the hydroxyl equivalents of component A2) are from polyester polyols,
    A2.2) 10 to 50% of the hydroxyl equivalents of component A2) are from polyacrylate polyols and/or alkoxylation products of bisphenol A and
    A2.3) 0 to 30 of the hydroxyl equivalents of component A2) are from other organic polyhydroxyl compounds, and B) cycloaliphatic polyamines having at least two primary amino groups, wherein components A) and B) are present in an equivalent ratio of blocked isocyanate groups to amino groups of 1:0.8 to 1:1.2.

The invention also relates to the use of these coating compositions for producing decorative, flying-stone-resistant, thick topcoats on metallic substrates.

1 Claim, No Drawings

HEAT CURABLE COATING COMPOSITIONS AND THEIR USE AS TOP COATS

BACKGROUND OF THE INVENTION

1. Field of the Invention

The present invention relates to new heat curable coating compositions containing butanone oxime-blocked isocyanate prepolymers and cycloaliphatic polyamines and to their use for producing decorative coatings that are resistant to flying stones on a metal substrate, e.g., in the door sill area of a motor car.

2. Description of the Prior Art

Heat curable, one-component primers, which are resistant to flying stones and prepared from blocked NCO prepolymers and diamines, are known. This type of coating composition, described for example in DE-PS 2,131,299, contains aromatic diisocyanates and polyether polyols. In view of these structural components it is obvious that these coatings can really only be used beneath a top coat. If they were used as a top coat, they would turn yellow and chalky in the light.

The same is true of the coating compositions according to EP-A-0,536,614, which are only used as undercoating lacquers or as underbody sealants. It is a common feature of both systems that they use ε-caprolactam as a blocking agent, which requires stoving temperatures of about 160° C. In practice there is an increasing demand for coatings which are based on blocked polyisocyanates which can be cured at about 140° C.

Coating compositions are known from EP-A-0,059,962, which are based on ketoxime-blocked NCO prepolymers prepared from aliphatic diisocyanates. In the working examples, only NCO prepolymers prepared from polyether polyols are described. The presence of polyether polyols and the disclosed use of the systems for producing undercoats, which are resistant to flying stones, leads to the conclusion that the coating compositions are not intended for use as decorative light-resistant topcoats.

Although in the general description of the publication, polyesterpolyols are also disclosed as suitable polyhydroxyl compounds for producing the NCO prepolymers, they were not considered to be preferred polyols as can be seen from their absence in the working examples.

An object of the present invention is to provide heat curable coating compositions containing blocked NCO prepolymers and cycloaliphatic diamines which combine the following properties:

light resistance for use to produce light-resistant topcoats;

stoving temperatures of ca. 140° C.;

storage stability at 25° C. for a period of at least 6 months. In this case, "storage stability" is understood to be the ability to be applied without any problems, i.e., with at most a negligible increase in viscosity;

suitability for the production of decorative outer coatings and hard and tough consistency, thereby ensuring suitability for protection against flying stones.

This object may be achieved with the binders according to the invention which are described below and based on NCO prepolymers prepared from selected starting materials.

SUMMARY OF THE INVENTION

The present invention relates to heat curable coating compositions containing a binder consisting essentially of A) prepolymers which have butanone oxime-blocked isocyanate groups and an average molecular weight, calculated from the NCO content and NCO functionality, of 1000 to 10,000, and are prepared from
  A1) (cyclo)aliphatic polyisocyanates and
  A2) an organic polyhydroxyl component in which
    A2.1) 50 to 90%, preferably 60 to 80% of the hydroxyl equivalents of component A2) are from polyester polyols,
    A2.2) 10 to 50%, preferably 20 to 40% of the hydroxyl equivalents of component A2) are from polyacrylate polyols and/or alkoxylation products of bisphenol A that contain 2 to 4 alkylene oxide units per molecule and
    A2.3) 0 to 30 of the hydroxyl equivalents of component A2) are from organic polyhydroxyl compounds other than those set forth in A2.1) and A2.2), and
B) cycloaliphatic polyamines having at least two primary amino groups, wherein components A) and B) are present in an equivalent ratio of blocked isocyanate groups to amino groups of 1:0.8 to 1:1.2.

The invention also relates to the use of these coating compositions for producing decorative, flying-stone-resistant, thick topcoats on metallic substrates.

DETAILED DESCRIPTION OF THE INVENTION

Polyisocyanates A1) are preferably selected from (cyclo)aliphatic diisocyanates having a molecular weight of 140 to 300, more preferably 168 to 300, such as 1,6-diisocyanatohexane, 1-isocyanato-3,5,5-trimethyl-5-isocyanatomethyl-cyclohexane (isophorone diisocyanate or IPDI), 4,4'-diisocyanatodicyclohexylmethane, 1,4-diisocyanatobutane, 2,4 and/or 2,6-diisocyanato-1-methyl-cyclohexane ("hydrogenated TDI") and 1,3-bis-(1-isocyanato-1-methylethyl)-benzene (tetramethyl-xylylene diisocyanate or TMXDI).

Polyhydroxyl component A2) is selected from mixtures of the individual components A2.1), A2.2) and optionally A2.3), in which the percentages preferably add up to 100. Component A2.3) is preferably not used.

Component A2.1) has a hydroxyl value of 28 to 280 and a number average molecular weight ($M_n$ of 400 to 4000, preferably 500 to 2000, and preferably is selected from polyhydroxyl compounds which contain ester groups, but do not ether groups.

Suitable polyhydroxyl compounds containing ester groups include the known condensation products of polybasic acids or their anhydrides with excess amounts of polyhydric alcohols. Suitable polybasic acids or acid anhydrides include adipic acid, maleic acid, maleic anhydride, phthalic acid, phthalic anhydride, tetrahydrophthalic acid, tetrahydrophthalic anhydride, hexahydrophthalic acid, hexahydrophthalic anhydride and mixtures of these or other polybasic acids or acid anhydrides. Suitable polyhydric alcohols are those having a molecular weight of 62 to 200, such as ethylene glycol, propylene glycol, the isomeric butanediols, pentanediols, hexanediols and octanediols, glycerine, trimethylolpropane and mixtures thereof. Polyester polyols prepared from adipic acid and neopentyl glycol and/or 1,6-dihydroxyhexane and having a molecular weight of 500 to 2000 are particularly preferred.

Also suitable as polyhydroxyl compounds containing ester groups are 1) polylactonediols, for example, the reaction product of hexanediol-1,6 and ε-caprolactone having molecular weights of 500 to 1500 and 2) polycarbonate diols, in particular hexanediol-1,6-polycarbonate diols having a molecular weight of 500 to 2000, which may be prepared by condensing the diol with diphenyl carbonate or dimethyl carbonate in known manner.

Component A2.1) may also be selected from oligoesters of long-chain carboxylic acids which contain hydroxyl groups and are difficult to saponify, such as castor oil, in amounts of up to 50 wt. %, based on the total weight of component A2.1).

Component A2.2), which is used to regulate the hardness of the coating, is preferably selected from either polyacrylate polyols or alkoxylated bisphenol A.

Suitable polyacrylate resins are copolymers which are soluble in lacquer solvents and formed from monomers which contain hydroxyl groups and other olefinically unsaturated monomers such as butyl acrylate, methyl methacrylate, styrene, acrylic acid, acrylonitrile and/or methacrylonitrile. Suitable monomers which contain hydroxyl groups include, in particular, 2-hydroxyethyl (meth)acrylate and the isomeric mixture of hydroxypropyl (meth)acrylates obtained by the addition of propylene oxide to acrylic acid or methacrylic acid. The hydroxyl group content of suitable polyacrylate polyols is generally 1 to 10 wt. %.

Particularly preferred are polyacrylate polyols prepared from a mixture of hydroxypropyl methacrylate isomers, n-butyl acrylate, styrene and acrylic acid, and having an OH group content of 4 to 7 wt. %, based on solids, and a maximum acid value of 15 mg KOH/g.

Suitable alkoxylation products are preferably the ethoxylation or propoxylation products of bisphenol A, which contain a statistical average of 2 to 4 alkylene oxide units per molecule. These alkoxylation products have hydroxyl values of 243 to 354, preferably 300 to 340. The propoxylation products of bisphenol A are particularly preferred. The alkoxylation products may be used instead of the polyacrylate polyols and less preferably in admixture with the polyacrylate polyols.

Suitable polyhydroxyl compounds A2.3) include polyhydric alcohols having a molecular weight of 62 to 200, which have previously been described for the production of the polyester polyols.

The blocked NCO prepolymers are produced in known manner, for example, in a two-stage reaction by reacting polyhydroxyl compounds A2) with excess amounts of polyisocyanates A1) while maintaining an NCO/OH equivalent ratio of 2:1 to 2.5:1. The type and proportions of the starting components A1) and A2) are generally selected so that the resulting NCO prepolymer has an NCO content of 3.0 to 8.0 wt. %, preferably 4.5 to 7.0 wt. %, and has an average molecular weight in blocked form of 1000 to 10,000.

The blocking reaction with preferably stoichiometric amounts of butanone oxime follows production of the NCO prepolymer, optionally with the aid of solvents. Both reactions are generally performed at temperatures of about 50° to 120° C., preferably 60° to 80° C.

The blocked NCO prepolymers A) can also be produced in a one-step reaction, by reacting polyhydroxyl compounds A2), butanone oxime and polyisocyanate A1) within the previously disclosed temperature range until the NCO bands (IR spectrum) vanish. The proportions of the reaction components are selected such that there are approximately 1 hydroxyl equivalent and 1 oxime equivalent to 2 NCO equivalents.

The blocked NCO prepolymers A) may be diluted with organic solvents or plasticizers to form a solution having a solids content of 25 to 50 wt. % to obtain the optimum spray viscosity of the coating composition. Suitable solvents are known and include Solvesso 100 solvent, solvent naphtha, isobutanol, butyl acetate and/or methoxypropyl acetate. Suitable plasticizers are known and include plasticizers based on adipates, phthalates or alkylsulphonates.

Curing component B) is a cycloaliphatic polyamine having at least two primary amino groups. Examples include 4,4'-diaminodicyclohexylmethane, 1,4-diaminocyclohexane, 3,3,5-trimethyl-5-aminomethylcyclohexylamine (IPDA) and perhydrogenated triamino-diphenylmethanes, such as those used in accordance with DE-OS 3,417,683 to produce the corresponding cycloaliphatic triisocyanates. Mixtures of polyamines may also be used. 3,3'-dimethyl-4,4'-diamino-dicyclohexylmethane and 4,4'-diamino-dicyclohexylmethane are preferred.

The binder is produced by mixing components A) and B) in proportions selected such that there is an equivalent ratio of blocked NCO groups to primary amino groups of 1:0.8 to 1:1.2, preferably 1:1 to 1:1.2, and more preferably 1:1.05 to 1:1.1.

If desired, the coating compositions according to the invention may also contain known additives from lacquer technology, such as pigments, flow controllers, UV stabilizers, antioxidants, fillers and thixotropic agents. The binder components may be mixed with these additives before, during or after mixing components A) and B).

The coating compositions according to the invention are especially suited for producing stoved coatings on optionally pretreated metal substrates, in particular those which are used in the automobile industry. The coatings are generally stoved at a temperature of 120° to 160° C., preferably 120° to 140° C.

In the following examples, all percentages are by weight, except for relative changes in properties, which are given in %.

EXAMPLES

Example 1

This example describes the production of a coating composition according to the invention and the properties of a coating prepared therefrom. The polyol component contained 70 equivalent-% of polyester A2.1) and 30 equivalent-% of polyacrylate A2.2).

1.1. Preparation of the binder
Mixture:

| | |
|---|---|
| 595.0 g (0.7 equiv.) | of an adipic acid/hexanediol/neopentyl glycol polyester (wt. ratio of hexanediol: neopentyl glycol = 77:33) having an OH number of 66 |
| 108.6 g (0.3 equiv.) | of a commercial hydroxypolyacrylate having an acid number of 10 and prepared from hydroxypropyl methacrylate, butyl acrylate, styrene and acrylic acid. The OH group content, based on the 75% solution in xylene, is 4.7% and the OH equivalent weight is 362 g (Desmophen A Experimental Product LS 2051 of Bayer AG, Germany) |
| 2.4 g (1.1. equiv.) | of 1,6-diisocyanatohexane |
| 144.1 g (1.1 equiv.) | of 4,4'-diisocyanatodicyclohexylmethane |
| 104.4 g (1.2 equiv.) | of butanone oxime |
| 409.0 g | of solvent naphtha 100 |

1453.5 g (1.2 equiv of blocked NCO groups)

Experimental

The polyester, polyacrylate and two diisocyanates were initially introduced into a container and heated to 100° C. with stirring. After a reaction time of 1 hour, an NCO content of 5.3% was measured (calculated 5.36%). The mixture was diluted with the solvent and allowed to cool to about 60° C., and then butanone oxime was added incrementally such that the temperature did not rise above 70° C. Stirring was continued for 40 minutes at 70° C., until the NCO content could no longer be detected (IR spectrum). The blocked NCO prepolymer solution had a viscosity of about 2800 mPa.s at 23° C. and a blocked NCO equivalent weight of 1211 g (blocked NCO content: 3.46%).

1.2. Preparation of the coating composition

| | |
|---|---|
| 470.0 pts by wt. | blocked NCO prepolymer according to 1.1 |
| 48.5 pts by wt. | 3,3'-dimethyl-4,4'-diaminodicyclohexyl-methane |
| 47.0 pts by wt. | titanium dioxide (rutile form) |
| 211.5 pts by wt. | barium sulphate |
| 3.0 pts by wt. | carbon black FW 200 |
| 95.0 pts by wt. | magnesium silicate hydrate (Norwegian talc) |
| 12.0 pts by wt. | highly dispersed silica |
| 45.0 pts by wt. | 3-methoxy-n-butyl acetate |
| 56.0 pts by wt. | pine oil |
| 12.0 pts by wt. | butyl acetate |
| 1000.0 pts by wt. | |

The components, with the exception of the diamine crosslinker, were dispersed in a dissolver (8000 rpm) for about 30 minutes. Care was taken that the temperature of the material being dispersed did not exceed 50° C. The 48.5 pts by wt. of 3,3'-dimethyl-4,4'-diaminodicyclohexylmethane were then vigorously stirred into the dispersed mixture.

A heat curable, one-component coating composition was obtained, which can be used in this form in a compressed air process or an airless spraying process. The binder of the coating composition contained 470 g (0.388 equiv.) of the blocked NCO prepolymer and 48.5 g (0.407 equiv $NH_2$) of 3,3'-dimethyl-4,4'-diamino-dicyclohexylmethane. The blocked NCO/$NH_2$ equivalent ratio was 1:1.05.

1.3. Properties of the coating composition
1.3.1. Viscosity

Coating composition 1.2 had a calculated solids content of about 75% and a viscosity, determined according to DIN 53 214 (with a rate of shearing fall D of 39.9 $sec^{-1}$), of 3000 to 3500 mPa.s, depending on the rotating body used.

1.3.2. Stoving conditions

The coating composition was cured without the addition of a catalyst at 130°–140° C. within 30 minutes to give a tough, elastic film having a Shore A hardness of about 65.

1.3.3. Storage stability

Since the coating composition represented a potentially reactive system containing primary amino groups, blocked NCO groups and also polyester groups (which represent the backbone of the polymer structure), storage stability was a major test criterion. It was found that after 30 days storage at room temperature, the viscosity remained unaltered. After storage for 1 year at room temperature, the viscosity rose (DIN 53019/01) only slightly, i.e., only by about 30% compared to the starting value. Also, storage for 7 days at 50° C. in a drying cabinet resulted in a viscosity increase of only about 20%, compared to the starting value.

1.3.4. Resistance to flying stones

Coating composition 1.2 was applied to test metal sheets (which had been precoated with a cathodic deposition primer) in an amount such that a film with a thickness of 200 μm was produced after stoving (30 min at 140° C.). The coated sheets were subjected to an abrasion test in accordance with the Daimler Benz AG company specification. For this, morainic stone chippings having a diameter of 5 to 8 mm (supplier: C. F. Mayer, Sindelfingen-Dachsklinge) were shot at the coating with a pressure of 0.8 bar. The time which was required for clean sheet metal to appear at the point of impact of the beam of stone chippings was then measured. When the preceding coating was tested, the stone chippings required a time of 75 sec, which represents good abrasion resistance for a coating prepared from the coating composition according to the invention.

1.3.5. Weathering behavior

Test metal sheets coated with the coating composition 1.2 were subjected to a QUV test according to ASTM G 53–77 in UVB equipment 313. After 2000 hours of weathering, the coating was inspected and no cracks, chalking or decrease in gloss was observed.

Example 2

Example 1 was repeated with the exception that 51.9 g (0.3 equiv.) of a propoxylated bisphenol A having molecular weight 346 were used instead of 108.6 g (0.3 equiv.) of the polyacrylate resin.

The viscosity of the coating composition, determined using the method given in example 1, was 3000 to 4000 mPa.s. The storage stability corresponded to the storage stability of the coating composition according to example 1. The coating composition was applied to test panels as described in example 1 and cured at 130° to 140° C. to form a tough, elastic film having a Shore A hardness of 70. The flying stone test produced a time of 75 secs. The weathering behavior corresponded to the weathering behavior of the coating from example 1.

Example 3 (comparison)

Example 1 was repeated with the exception that the polyacrylate resin was omitted and the amount of polyester polyol was increased to 850.0 g (1.0 equiv.).

The viscosity of the coating composition, determined by the method given in example 1, was 2000 to 3000 mPa.s. The storage stability corresponded to the storage stability of the coating composition according to example 1. The coating composition was applied to test panels as described in example 1 and cured at 130° to 140° C. to form a soft, elastic film having a Shore A hardness of only 40. Consequently, an abrasion time of only 45 sec was produced in the flying stone test, which represents a time of resistance which is more than ⅓ shorter than that of the coating compositions according to the invention.

Example 4

4.1. Preparing the binder
Mixture:

| | |
|---|---|
| 425.0 g (0.5 equiv.) | of the polyester from example 1 |
| 102.0 g (0.3 equiv.) | of castor oil, OH value 164 |
| 34.6 g (0.2 equiv.) | of the propoxylated bisphenol A from example 2 |
| 131.0 g (1.0 equiv.) | of 4,4'-diisocyanato-dicyclohexylmethane |
| 92.4 g (1.1 equiv.) | of 1,6-diisocyanatohexane |
| 95.7 g (1.1. mol) | of butanone oxime |
| 378.0 g | of solvent naphtha 100 |
| 1258.7 g (1.1 equiv. blocked NCO groups) | |

Experimental

The two diisocyanates, the polyester and the bisphenol A derivative were initially introduced and heated to 100° C. with stirring. After a reaction period of about 2 hours at 100° C., an NCO content of 5.9% was measured (5.98% calculated). The mixture was diluted with solvent naphtha 100, cooled to about 50° C. and butanone oxime was added dropwise. Stirring was continued at 70° C. for about 30 minutes until no more NCO groups were detectable (IR spectrum). A clear, pale yellow solution was obtained (70% solids content) having a viscosity at 23° C. of ca. 3700 mPa.s and a blocked NCO equivalent weight of 1144, which corresponds to a blocked NCO content of 3.6%.

4.6. Preparation of the coating composition
Mixture:

| | |
|---|---|
| 468.5 parts by wt. | blocked NCO prepolymer according to 2.1. |
| 51.1 pts by wt. | 3,3'-dimethyl-4,4'-diaminodicyclohexyl methane |
| 41.4 pts by wt. | titanium dioxide (rutile form) |
| 224.1 pts by wt. | barium sulphate |
| 94.2 pts by wt. | magnesium silicate hydrate (Norwegian talc) |
| 11.3 pts by wt. | highly disperse silica |
| 11.0 pts by wt. | butyl acetate |
| 43.8 pts by wt. | 3-methyl-n-butyl acetate |
| 54.6 pts by wt. | pine oil |
| 1000.0 pts by wt. | |

The above components, except for the diamine crosslinker, were dispersed in a dissolver (8000 rpm) for about 30 minutes. Care was taken to avoid the material being dispersed from exceeding a temperature of 50° C. Then the 3,3'-dimethyl-4,4'-diaminodicyclohexylmethane was mixed with the dispersed material. A heat curable, one-component coating composition was obtained which can be used in a variety of spraying processes. The binder of the coating composition contained 8.5 g (0.409 equiv.) of the above blocked NCO prepolymer and 51.1 g (0.430 equiv. $NH_2$) of 3,3'-dimethyl-4,4'-diaminodicyclohexylmethane.

The blocked NCO/$NH_2$ equivalent ratio was 1:1.05.

4.3. Properties of the coating composition 4.3.1. Viscosity

The viscosity at 23° C. of the coating composition, determined by the method given in example 1, at a solids content of about 75% was 3000–4000 mPa.s (DIN 53 214).

4.3.2. Stoving conditions

The coating composition was cured at 130°–140° C. without the use of a catalyst for 30 minutes to give a tough elastic film having a Shore A hardness of about 65.

4.3.3. Storage stability

The coating composition was storage stable. After storage for 30 days at room temperature, no increase in viscosity was observed. After storage for 7 days in a drying cabinet at 50° C. an increase in viscosity (DIN 53019/01) of only 20%, compared to the starting value, was found.

4.3.4. Resistance to flying stones

The above coating composition was applied to lacquer test metal sheets from Mercedes Benz AG, which had been precoated with a cathodic deposition primer, and stoved at 140° C. for 30 min in a drying cabinet. A dry film thickness of 150 μm was produced. This coated sheet was subjected to the abrasion test in accordance with the Mercedes Benz specification, i.e. the sheet was shot at with morainic stone chippings (diameter 5–8 mm) under a pressure of 0.8 bar. The time was measured at which the coating was rubbed off the sheet and bare metal was exposed at the point of impact. Abrasion times of 70 sec were determined, which is an excellent value since 60 sec represents a high abrasion resistance.

4.3.5. Adhesion

The coating composition according to the invention was intended to be used as decorative protection against flying stones, i.e., occasionally as a topcoat. To determine if the preceding coating composition was suitable for this application, it was applied to a lacquer test metal sheet which had been precoated with two-layers (undercoat and clear coat) of a two-component polyurethane coating composition, and stoved at 140° C. for 30 min. A dry film thickness of 200 μm was produced. A cross-hatch adhesion test was then performed (DIN 53 151). The coating had a characteristic GT value of 0, i.e., the edges of the cut were completely smooth and no sections of the hatched cut coating had flaked away.

Example 5

This example describes the production of a binder according to the invention in plasticizer instead of solvent. Using these binders, bubblefree coatings having a thickness of several millimeters can be produced.

5.1. Preparing the binder

| | |
|---|---|
| 255.0 g (0.3 equiv.) | of the polyester from example 1 |
| 153.0 g (0.45 equiv.) | of castor oil, OH value 164 |
| 43.3 g (0.25 equiv.) | of the propoxylated bisphenol A from example 2 |
| 100.8 g (1.2 equiv.) | of 1,6-diisocyanatohexane |
| 117.9 g (0.9 equiv.) | of 4,4'-diisocyanato-dicyclohexylmethane |
| 95.7 g (1.1 equiv.) | of butanone oxime |
| 138.0 g (1.16 equiv.) | of 3,3'-dimethyl-4,4'-diaminodicyclohexyl methane |
| 430.0 g | plasticizer; benzyloctyl adipate |
| 1333.7 g | one-component binder |

Experimental

The two diisocyanates and then the polyester and the bisphenol A derivative were initially introduced and heated to 100° C. with stirring. After a reaction period of about 2 hours, an NCO content of 6.5% was measured (6.9% calculated). While the mixture cooled to about 50° C., it was diluted with plasticizer. Butanone oxime was added dropwise, which caused the temperature to increase to 70° C. The mixture was then stirred at 70° C. for about 30 min until no more NCO groups were detectable (IR spectrum). The liquid diamine was then added to from a clear, pale yellow, one-component binder having a viscosity at 23° C. of ca. 7500 mPa.s.

5:2. Properties of the binder 5.2.1. Stoving conditions/hardness of the film

The composition was poured into an aluminum dish (diameter 6 cm). The thickness of the layer was several millimeters. The composition was cured in a drying cabinet at 140° C. for 30 minutes. The cured, approximately 5 mm thick test specimens were tough and elastic and had a Shore A hardness of 45. The specimens were cut up. No evaporation bubbles were observed at the cut faces, i.e., the thick layer had cured without the production of bubbles.

5.2.2. Storage stability

After storage for 30 days at room temperature, no increase in viscosity was observed. After storage for 7 days in a drying cabinet at 50° C., an increase in viscosity (DIN 53019/01) of about 20%, compared to the initial value was found. This finding means that the binder was storage stable.

5.2.3. Resistance to flying stones

The binder was applied to a test metal sheet to provide a film thickness of 300 μm and stoved at 140° C. for 30 min. This thickly coated sheet was shot at with morainic stone chippings under a pressure of 0.8 bar, as described in example 1.3.4. An abrasion time of 255 sec was determined for the thick coating, which was a very good result. The fact that this value was higher than in the preceding examples is attributed to the lack of pigment in the formulation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat curable coating composition containing a binder consisting essentially of
   A) a prepolymer which has butanone oxime-blocked isocyanate groups and an average molecular weight, calculated from the NCO content and NCO functionality, of 1000 to 10,000, and is prepared from
      A1) a (cyclo)aliphatic polyisocyanate and
      A2) an organic polyhydroxyl component in which
         A2.1) 50 to 90% of the hydroxyl equivalents of component A2) are from a polyester polyol,
         A2.2) 10 to 50% of the hydroxyl equivalents of component A2) are from a polyacrylate polyol and/or an alkoxylation product of bisphenol A that contains 2 to 4 alkylene oxide units per molecule and
         A2.3) 0 to 30 of the hydroxyl equivalents of component A2) are from an organic polyhydroxyl compound other than those set forth in A2.1) and A2.2), and
   B) a cycloaliphatic polyamine having at least two primary amino groups, wherein components A) and B) are present in an equivalent ratio of blocked isocyanate groups to amino groups of 1:0.8 to 1:1.2.

* * * * *